Aug. 23, 1932.  W. M. JAMES  1,872,740

SERVING TRAY

Filed March 30, 1931

Inventor

WATHEN M. JAMES

By

Attorney

Patented Aug. 23, 1932

1,872,740

UNITED STATES PATENT OFFICE

WATHEN M. JAMES, OF DENVER, COLORADO

SERVING TRAY

Application filed March 30, 1931. Serial No. 526,248.

This invention relates to a serving tray. It is principally designed for use in automobiles at roadside refreshment stands and for "curb service" at drug stores, soda fountains, and the like. The principal object of the invention is to provide an efficient tray for this purpose which can be quickly and easily placed on the interior of an automobile and which will automatically adapt itself to the particular automobile and rigidly and securely support itself in place.

Another object of the invention is to so construct the device that it can be placed between the steering wheel of the automobile and the driver and so that the automobile windows can be closed while the tray is in position.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Figure 1:
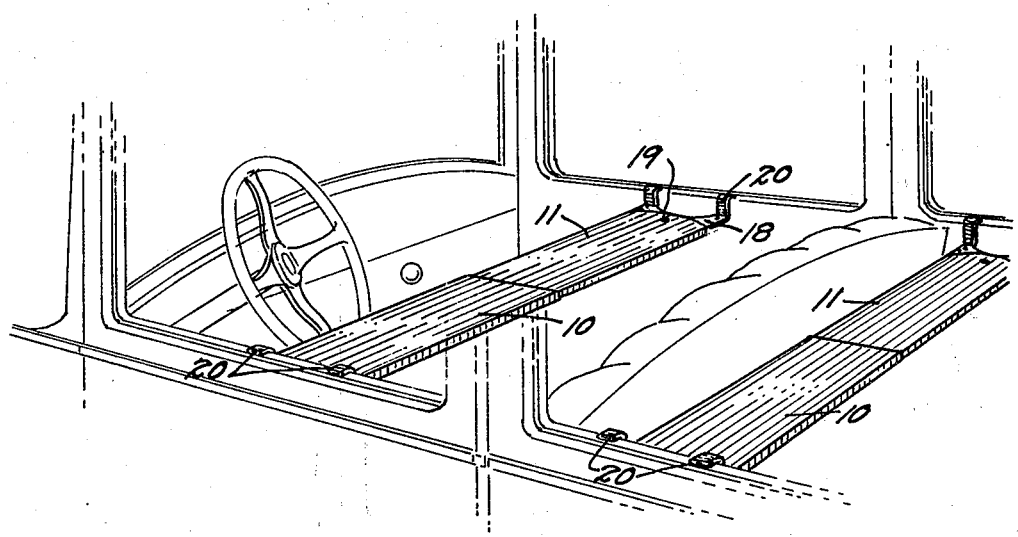
Fig. 1 is a phantom view illustrating the invention in place in an automobile.
Figure 2:
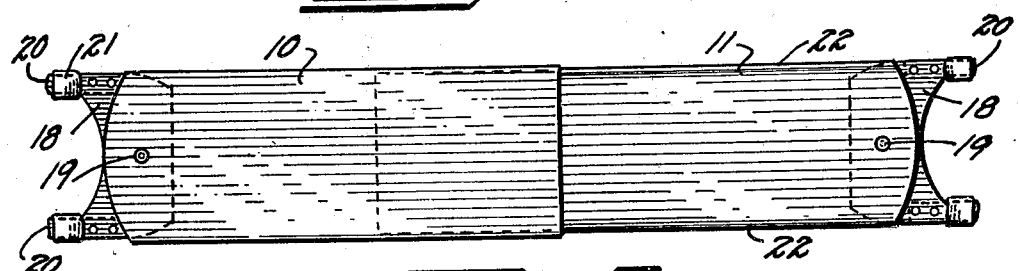
Fig. 2 is a plan view of the improved automobile serving tray.
Figure 3:
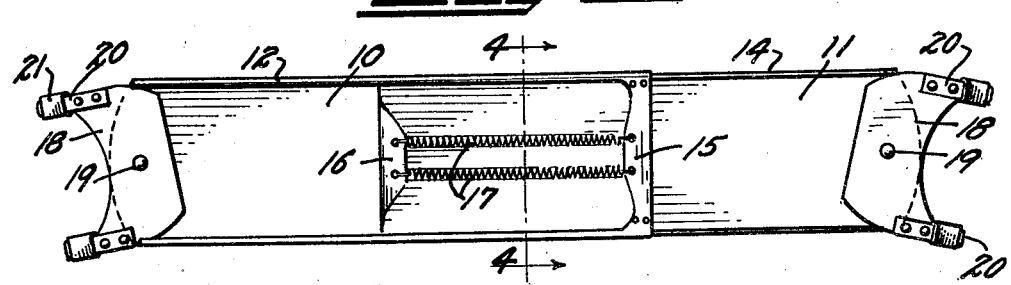
Fig. 3 is a bottom view thereof.

The serving tray is formed in two principal telescoping sections 10 and 11. The section 10 is preferably formed with downwardly turned flanges 12 provided with an upwardly turned edges 13 which form slideways for downwardly turned edges 14 on the section 11.

The inner extremity of the section 10 is provided with a bridging member 15 extending entirely across the bottom thereof. The inner extremity of the section 11 is turned backwardly as shown at 16. One or more tension springs 17 extend between the bridging member 15 and the turned back extremity 16 so as to act to constantly force the two sections outwardly toward the extended position.

Each extremity of the tray is provided with what might be termed a swivel plate 18 which are pivoted or hinged to the tray sections by means of pivot pins 19. The swivel plates carry upwardly extending, hook-shaped brackets 20 which are preferably surrounded by rubber tubing 21 or other protective material.

Figure 4:
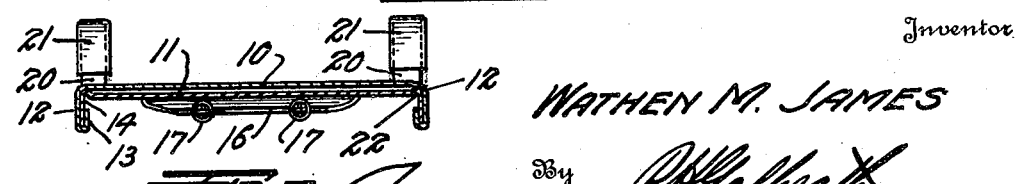
Fig. 4 is a slightly enlarged cross section taken on the line 4—4, Fig. 3.

It is preferred to form the section 11 with two longitudinal extending edge ridges 22 which will contact with the member 10 so as to maintain the surfaces of the two members slightly spaced apart as shown in Fig. 4. If the tray is painted or enameled these two ridges will prevent the section 10 from scraping the paint or enamel from the section 11 as the sections are forced together.

In use, the tray is inserted through one of the automobile windows and the brackets 20 at the far end are rested upon the far window sill. The tray is then compressed so as to bring the near brackets 20 inside the car so that they may be hooked upon the near window sill. The tray is then released and the springs 17 act to force the extremities outwardly against the inner walls of the automobile so as to firmly clamp the tray in place.

In the average automobile the inner walls are not parallel but are inclined toward each other at various angles. The swivel plates 18 are designed so that they automatically swing upon their pivot pins 19 so as to align the brackets 20 to the angle of the particular automobile. The rubber tubings 21 form a cushion which prevents marring or scratching of the automobile finish. When in place the extremities of the brackets 20 do not extend over the sills sufficiently far to obstruct the raising of the window glass.

While the invention has been described as particularly applicable for use in an automobile it is to be understood that the invention is not limited to such a use. It will also be valuable wherever it is desired to support a temporary table or surface between surrounding objects.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A supporting surface formed in two telescoping sections; spring means acting to urge said sections toward the extended position; and supporting members carried at the outer extremities of said sections for supporting said surface from a supporting structure.

2. A supporting surface formed in two telescoping sections; spring means acting to urge said sections toward the extended position; supporting members carried at the outer extremities of said sections for supporting said surface from a supporting structure; swivel members arranged to carry said supporting members, said swivel members being pivoted to said sections so that said supporting members may swing to align themselves with the desired supporting structure.

3. An automobile serving tray comprising: a main section; a second section adapted to slide within said main section; springs extending between the inner extremities of said two sections so as to act to urge them toward the extended position; and supporting brackets carried at the outer extremities of said sections.

4. An automobile serving tray comprising: a main section; a second section adapted to slide within said main section; springs extending between the inner extremities of said two sections so as to act to urge them toward the extended position; swivel members pivoted at the outer extremities of said sections; and supporting brackets carried by said swivel members, said swivel members acting to allow said brackets to align with a supporting structure.

5. An automobile serving tray comprising: a main section; slide channels formed along the longitudinal edges of said main section; a second section adapted to slide within said main section in said slide channels; a bridging member formed adjacent the inner extremity of said main section and adapted to extend under said second section; springs extending between said bridging member and the inner extremity of said second section so as to act to urge said sections toward the extended position; and supporting brackets carried at the outer extremities of said sections.

6. An automobile serving tray comprising: a main section; slide channels formed along the longitudinal edges of said main section; a second section adapted to slide within said main section in said slide channels; a bridging member formed adjacent the inner extremity of said main section and adapted to extend under said second section; springs extending between said bridging member and the inner extremity of said second section so as to act to urge said sections toward the extended position; swivel plates; pivot pins holding said swivel plates to the extremities of said sections so that they are free to rock thereon and in a plane substantially parallel therewith.

7. An automobile serving tray comprising: a main section; slide channels formed along the longitudinal edges of said main section; a second section adapted to slide within said main section in said slide channels; a bridging member formed adjacent the inner extremity of said main section and adapted to extend under said second section; springs extending between said bridging member and the inner extremity of said second section so as to act to urge said sections toward the extended position; swivel plates; pivot pins holding said swivel plates to the extremities of said sections so that they are free to rock thereon and in a plane substantially parallel therewith; and hook shaped supporting brackets carried by said swivel plates.

In testimony whereof, I affix my signature.

WATHEN M. JAMES.